(12) United States Patent
Akiyama

(10) Patent No.: US 11,327,392 B2
(45) Date of Patent: *May 10, 2022

(54) LIGHT SOURCE DEVICE AND PROJECTOR IN WHICH WAVE PLATES ARE DOWNSIZED

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,761

(22) Filed: Jun. 17, 2020

(65) Prior Publication Data

US 2020/0401032 A1    Dec. 24, 2020

(30) Foreign Application Priority Data

Jun. 18, 2019 (JP) .............................. JP2019-112555

(51) Int. Cl.
*G03B 21/20* (2006.01)
*G03B 21/00* (2006.01)

(52) U.S. Cl.
CPC ....... *G03B 21/2073* (2013.01); *G03B 21/208* (2013.01); *G03B 21/006* (2013.01); *G03B 21/204* (2013.01)

(58) Field of Classification Search
CPC .............. G03B 21/2073; G03B 21/208; G03B 21/006; G03B 21/204
See application file for complete search history.

(56) References Cited

U.S. PATENT DOCUMENTS

| 2012/0140183 A1* | 6/2012 | Tanaka | G03B 21/28 |
| | | | 353/20 |
| 2014/0268063 A1 | 9/2014 | Akiyama et al. | |
| 2018/0017856 A1 | 1/2018 | Tanaka et al. | |
| 2018/0066828 A1* | 3/2018 | Akiyama | G02B 27/285 |

(Continued)

FOREIGN PATENT DOCUMENTS

| JP | 2012-137744 A | 7/2012 |
| JP | 2014-199401 A | 10/2014 |

(Continued)

*Primary Examiner* — Michelle M Iacoletti
*Assistant Examiner* — Magda Cruz
(74) *Attorney, Agent, or Firm* — Oliff PLC

(57) ABSTRACT

A light source device of the present disclosure includes a light emitting device that outputs a first light having a first wavelength in a first polarization direction, a first optical element having a first area and a second area, a second optical element into which the first light reflected by the first area is entered, converting the first light into a circularly-polarized second light having the first wavelength, and a diffuser element into which the second light is entered. The second light entering the second optical element is converted into a third light having the first wavelength in a second polarization direction, the third light is transmitted through the first area, the second light is transmitted through the second area, and a fourth light output from the diffuser element and entered into the first area and the second area is transmitted through the first area and the second area.

20 Claims, 5 Drawing Sheets

(56) References Cited

U.S. PATENT DOCUMENTS

| | | | |
|---|---|---|---|
| 2018/0252992 A1* | 9/2018 | Akiyama | H04N 9/3164 |
| 2018/0275496 A1* | 9/2018 | Shimizu | G03B 21/204 |
| 2019/0391473 A1* | 12/2019 | Uchiyama | H04N 9/3158 |
| 2019/0391476 A1* | 12/2019 | Akiyama | G03B 33/12 |
| 2019/0391477 A1* | 12/2019 | Akiyama | G03B 21/2066 |

FOREIGN PATENT DOCUMENTS

| | | | | |
|---|---|---|---|---|
| JP | 2017037175 A | * | 2/2017 | G03B 21/14 |
| JP | 2018-013764 A | | 1/2018 | |
| JP | 2019061082 A | * | 4/2019 | G03B 21/14 |
| JP | 2020008722 A | * | 1/2020 | G03B 21/00 |

* cited by examiner

LIGHT SOURCE DEVICE AND PROJECTOR IN WHICH WAVE PLATES ARE DOWNSIZED

The present application is based on, and claims priority from JP Application Serial Number 2019-112555, filed Jun. 18, 2019, the disclosure of which is hereby incorporated by reference herein in its entirety.

BACKGROUND

1. Technical Field

The present disclosure relates to a light source device and projector.

2. Related Art

JP-A-2012-137744 discloses a light source device for projector that separates a light beam output from a solid-state light source unit into two beams using polarization separation and combining means and respectively guides the beams into an optical path for fluorescence generation and an optical path for diffused light generation, combines fluorescence generated by a fluorescence material and a diffused light generated by a diffuser using the polarization separation and combining means, and generates an illumination light. In the light source device, for the optical path for diffused light generation, a quarter wave plate for reflecting the light beam transmitted through the polarization separation and combining means and reflected by the diffuser using the polarization separation and combining means is necessary.

When the quarter wave plate is formed using crystal quartz, there is a problem that the cost of the light source device is higher because the crystal quartz is very expensive.

SUMMARY

A light source device according to a first aspect of the present disclosure includes alight emitting device that outputs a first light having a first wavelength in a first polarization direction, a first optical element having a first area that reflects the first light and a second area different from the first area, a second optical element into which the first light reflected by the first area of the first optical element is entered, converting the first light into a circularly-polarized second light having the first wavelength, and a diffuser element into which the second light output from the second optical element is entered, wherein the second light reflected by the diffuser element and entering the second optical element is converted into a third light having the first wavelength in a second polarization direction by the second optical element, the third light output from the second optical element and entered into the first area of the first optical element is transmitted in the first area of the first optical element, the second light reflected by the diffuser element and entered into the second area of the first optical element is transmitted in the second area of the first optical element, and a fourth light output from the diffuser element and entered into the first area and the second area of the first optical element and having a second wavelength is transmitted in the first area and the second area of the first optical element.

In the light source device according to the first aspect, in the first optical element, the first area may be provided at a center of the first optical element and the second area may be provided around the first area.

In the light source device according to the first aspect, the second optical element may be placed to face the first area at one side of the first optical element.

In the light source device according to the first aspect, the second optical element may be formed using quartz crystal.

The light source device according to the first aspect may further include a third optical element into which the third light output from the first area of the first optical element is entered, and the third optical element may convert the third light into a circularly-polarized fifth light having the first wavelength.

In the light source device according to the first aspect, the third optical element may be placed to face the first area at another side of the first optical element.

In the light source device according to the first aspect, the third optical element may be formed using quartz crystal.

In the light source device according to the first aspect, a diffuse reflection portion that diffusely reflects a part of the second light may be provided at a light incident side of the diffuser element.

In the light source device according to the first aspect, the diffuse reflection portion may have an optical film that reflects the part of the second light and transmits the rest of the second light.

In the light source device according to the first aspect, a luminous flux width compression unit provided between the light emitting device and the first optical element and compressing a luminous flux width of the first light output from the light emitting device may be provided.

A projector according to a second aspect of the present disclosure includes the light source device according to the aspect of the present disclosure, a light modulation device that modulates the light output from the light source device according to image information and forms an image light, and a projection optical device that projects the image light.

DESCRIPTION OF EXEMPLARY EMBODIMENTS

First Embodiment

As below, a first embodiment of the present disclosure will be explained using the drawings.

A projector of the embodiment is an example of a liquid crystal projector including a light source device using a semiconductor laser.

Note that, to clearly show the respective component elements in the following respective drawings, the scales of dimensions may be varied depending on the component elements.

Figure 1:
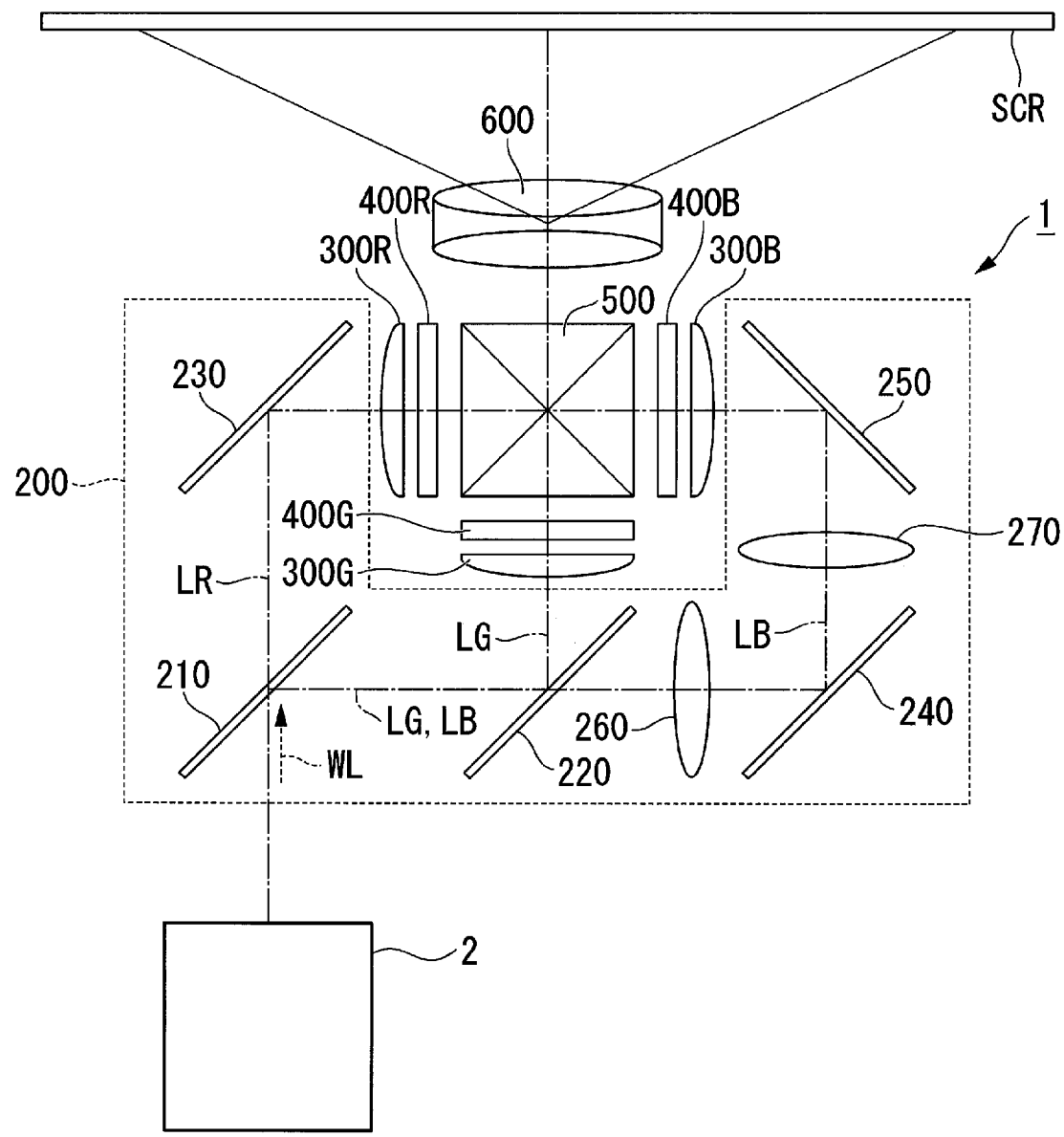
FIG. 1 is a schematic configuration diagram of a projector of one embodiment.

FIG. 1 is the schematic configuration diagram of a projector 1 of the embodiment.

As shown in FIG. 1, the projector 1 includes a light source device 2, a color separation and light guiding system 200, a light modulation device for red light 400R, a light modulation device for green light 400G, a light modulation device for blue light 400B, a cross dichroic prism 500, and a projection optical system 600. The light modulation device for red light 400R, the light modulation device for green light 400G, and the light modulation device for blue light 400B of the embodiment correspond to a light modulation device in the appended claims.

In the embodiment, the light source device 2 outputs a white illumination light WL including a red light LR, a green light LG, and a blue light LB.

The color separation and light guiding system 200 includes a dichroic mirror 210, a dichroic mirror 220, a reflection mirror 230, a reflection mirror 240, a reflection mirror 250, a relay lens 260, and a relay lens 270. The color separation and light guiding system 200 separates the illumination light WL from the light source device 2 into the red light LR, the green light LG, and the blue light LB and guides the lights to the light modulation device for red light 400R, the light modulation device for green light 400G, and the light modulation device for blue light 400B.

A field lens 300R is placed between the color separation and light guiding system 200 and the light modulation device for red light 400R. A field lens 300G is placed between the color separation and light guiding system 200 and the light modulation device for green light 400G. A field lens 300B is placed between the color separation and light guiding system 200 and the light modulation device for blue light 400B.

The dichroic mirror 210 transmits the red light LR and reflects the green light LG and the blue light LB. The dichroic mirror 220 reflects the green light LG and transmits the blue light LB. The reflection mirror 230 reflects the red light LR. The reflection mirror 240 and the reflection mirror 250 reflect the blue light LB.

The light modulation device for red light 400R, the light modulation device for green light 400G, and the light modulation device for blue light 400B are respectively formed using liquid crystal panels that modulate incident color lights according to image information and form images.

Note that a light incident-side polarizer (not shown) is placed between the field lens 300R and the light modulation device for red light 400R. A light incident-side polarizer (not shown) is placed between the field lens 300G and the light modulation device for green light 400G. A light incident-side polarizer (not shown) is placed between the field lens 300B and the light modulation device for blue light 400B. A light exiting-side polarizer is placed between the light modulation device for red light 400R and the cross dichroic prism 500. A light exiting-side polarizer is placed between the light modulation device for green light 400G and the cross dichroic prism 500. A light exiting-side polarizer is placed between the light modulation device for blue light 400B and the cross dichroic prism 500.

The cross dichroic prism 500 combines the respective image lights output from the light modulation device for red light 400R, the light modulation device for green light 400G, and the light modulation device for blue light 400B and forms a color image. The cross dichroic prism 500 has a substantially square shape in a plan view formed by bonding of four rectangular prisms and dielectric multilayer films are provided at substantially X-shaped interfaces at which the rectangular prisms are bonded.

The color image output from the cross dichroic prism 500 is enlarged and projected on a screen SCR by the projection optical system 600.

Light Source Device

Figure 2:
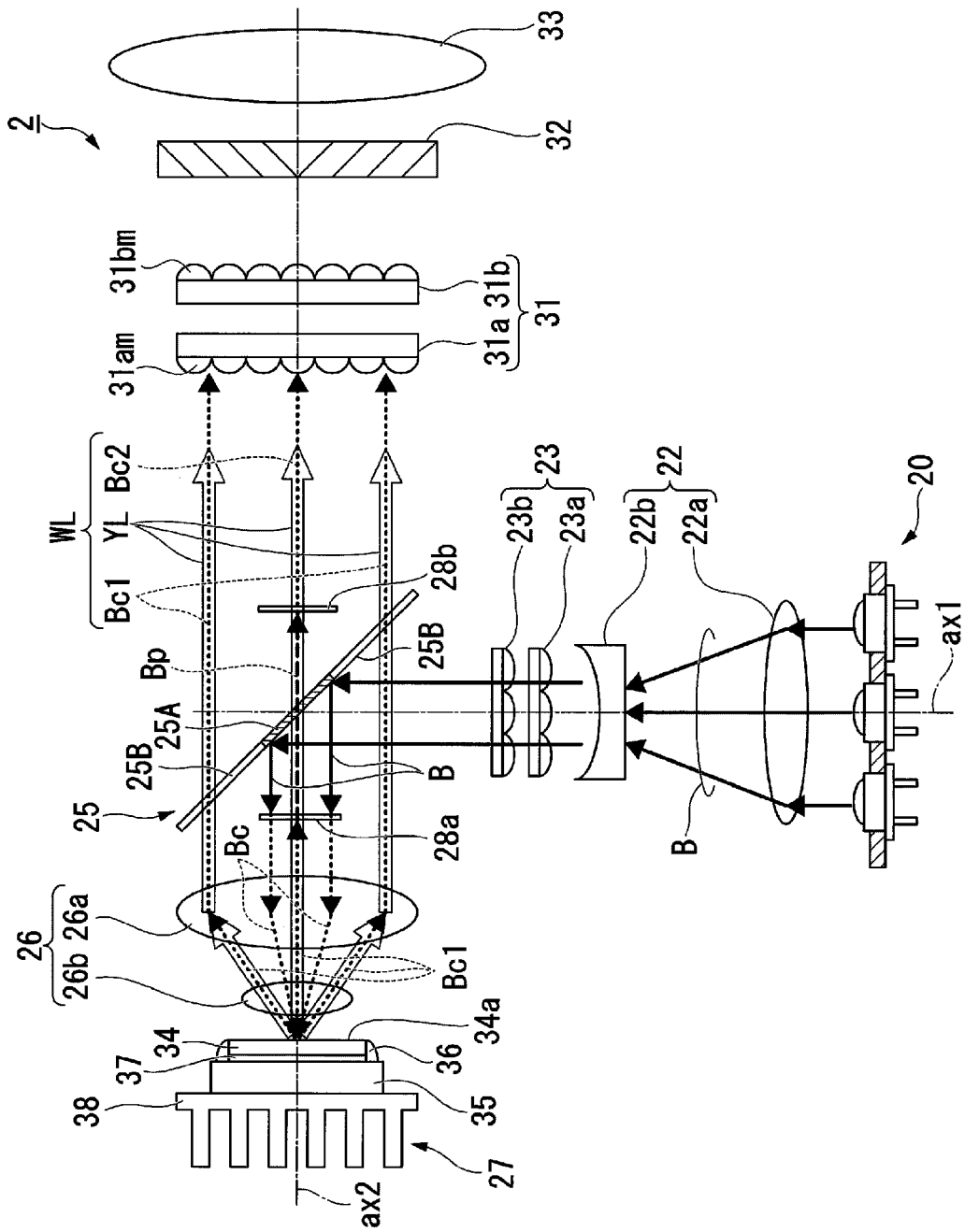
FIG. 2 shows a schematic configuration of a light source device.

Subsequently, the light source device 2 will be explained. FIG. 2 shows the schematic configuration of the light source device 2.

As shown in FIG. 2, the light source device 2 includes a blue array light source (light emitting device) 20, an afocal system (luminous flux width compression unit) 22, a homogenizer system 23, a light combining element (first optical element) 25, a collecting system 26, a diffuser element 27, a first wave plate (second optical element) 28a, a second wave plate (third optical element) 28b, an optical integration system 31, a polarization conversion element 32, and a superimposing lens 33.

The blue array light source 20, the afocal system 22, the homogenizer system 23, and the light combining element 25 are sequentially placed in juxtaposition on an optical axis ax1 of the blue array light source 20.

The diffuser element 27, the collecting system 26, the first wave plate 28a, the light combining element 25, the second wave plate 28b, the optical integration system 31, the polarization conversion element 32, and the superimposing lens 33 are sequentially placed in juxtaposition on an illumination light axis ax2. The optical axis ax1 and the illumination light axis ax2 are within the same plane and orthogonal to each other.

The blue array light source 20 is explained.

Figure 3:
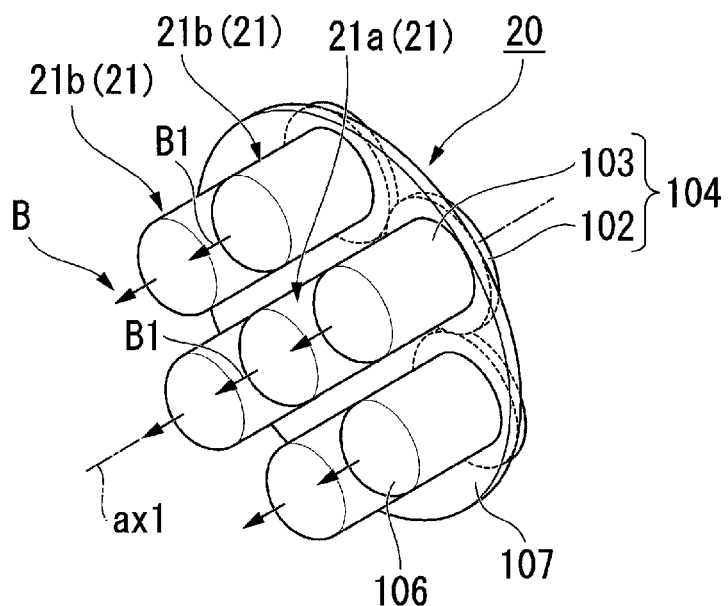
FIG. 3 is a perspective view of a blue array light source.
Figure 4:
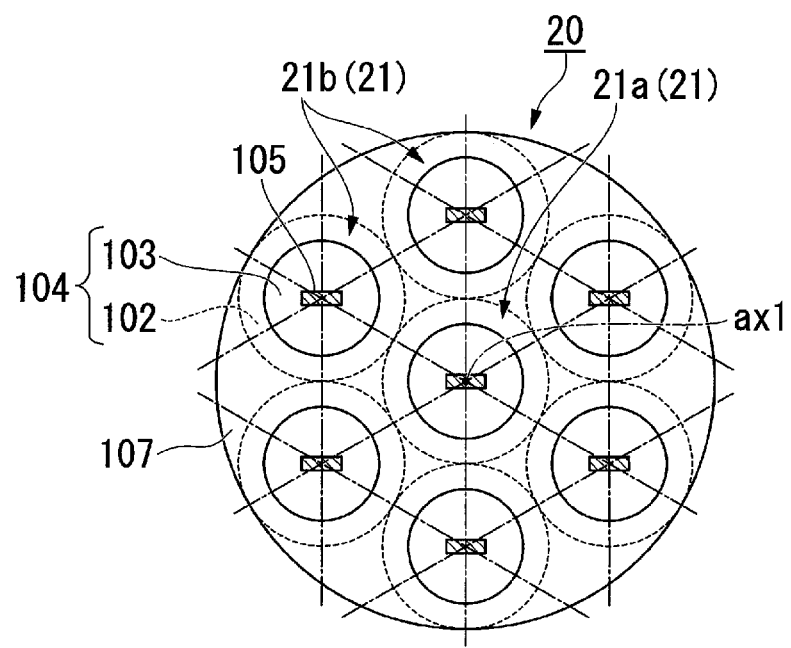
FIG. 4 is a plan view of the blue array light source as seen in a direction along an optical axis.

FIG. 3 is the perspective view of the blue array light source 20. FIG. 4 is the plan view of the blue array light source 20 as seen in a direction along the optical axis ax1.

As shown in FIGS. 3 and 4, the blue array light source 20 includes a plurality of light emitting elements 21. In the embodiment, the blue array light source 20 includes the seven light emitting elements 21. The seven light emitting elements 21 include one first light emitting element 21a located on the optical axis ax1 of the blue light LB, and six second light emitting elements 21b provided to surround the first light emitting element 21a. As described above, the surrounding six second light emitting elements 21b are provided substantially rotationally symmetrically around the optical axis ax1 of the blue light LB. The seven light emitting elements 21 are supported by a supporting member 107.

Each light emitting element 21 is formed using a semiconductor laser of CAN package type. The light emitting element 21 includes a package 104 having a base 102 and a can body 103, a semiconductor laser element 105 housed in the package 104, and a collimator lens 106. The semiconductor laser element 105 outputs e.g. a blue beam B1 having a peak wavelength from 440 nm to 470 nm (a first light having a first wavelength). The collimator lens 106 is provided in a light exiting opening of the package 104. The collimator lens 106 substantially parallelizes the blue beam B1 output from the semiconductor laser element 105.

As described above, the light emitting element 21 outputs the parallelized blue beam B1. The blue array light source 20 outputs a blue light B formed of the seven blue beams B1. The principal rays of the respective plurality of blue beams B1 are parallel to one another. The blue beams B1 output from the respective semiconductor laser elements 105 are linearly-polarized beams. That is, the blue light B output from the blue array light source 20 is a linear-polarized light.

The blue light B output from the blue array light source 20 enters the afocal system 22. The afocal system 22 is a system for compressing the luminous flux width of the blue light B and includes e.g. two afocal lenses 22a, 22b. The blue light B having the luminous flux width adjusted through the afocal system 22 enters the homogenizer system 23.

The homogenizer system 23 has multi-lenses 23a, 23b. The homogenizer system 23 homogenizes the illuminance distribution of the diffuser element 27 as an illuminated region with the collecting system 26. The blue light B transmitted through the homogenizer system 23 enters a part of the light combining element 25.

Figure 5:
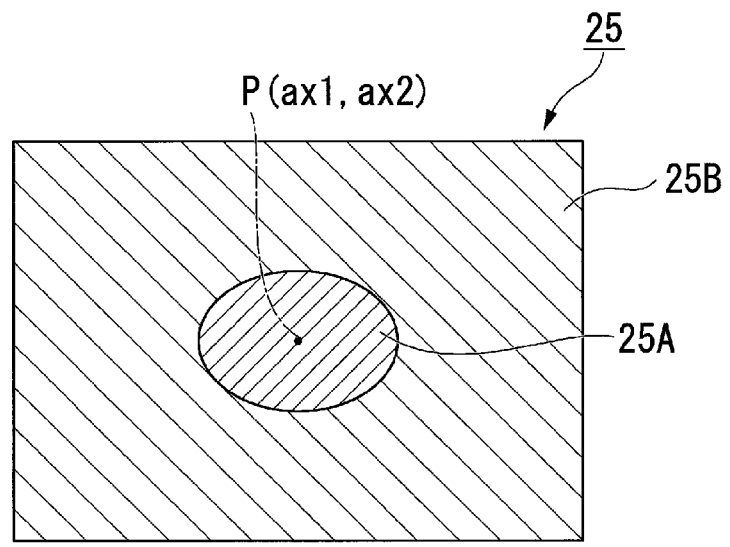
FIG. 5 shows a planar configuration of a light combining element.
Figure 6:
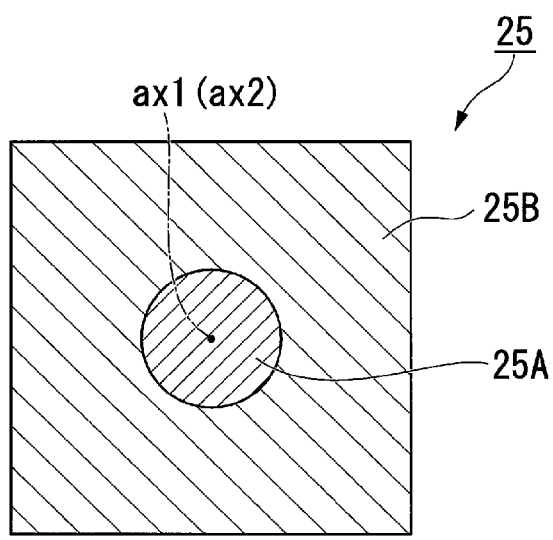
FIG. 6 shows a perspective configuration of the light combining element.

FIG. 5 shows the planar configuration of the light combining element 25. FIG. 5 is a plan view as seen from the normal direction in the surface of the light combining element 25. FIG. 6 shows the perspective configuration of the light combining element 25. FIG. 6 shows the configuration of the light combining element 25 in a plan view in a direction along the optical axis ax1 or the illumination light axis ax2 in FIG. 2.

As shown in FIG. 5, the light combining element 25 includes a transparent substrate and a polarization beam splitter. The polarization beam splitter is provided on a part of the transparent substrate. The light combining element 25 of the embodiment includes a first area 25A and a second area 25B different from the first area 25A.

The first area 25A is formed by a formation area of the polarization beam splitter on the transparent substrate. The second area 25B is formed by a non-formation area of the polarization beam splitter on the transparent substrate.

The transparent substrate is formed using e.g. a light-transmissive member of glass, plastic, or the like and can transmit an incident light regardless of the wavelength range of the light. The polarization beam splitter has a polarization separation function of separating an incident light into an S-polarized light and a P-polarized light with respect to the polarization beam splitter. Further, the polarization beam splitter has a color separation function of transmitting a fluorescent light YL output from the diffuser element 27 and having a different wavelength range from the blue light B (a fourth light having a second wavelength) regardless of the polarization state thereof.

In the embodiment, the blue light B output from the blue array light source 20 corresponds to the S-polarized light (in a first polarization direction) with respect to the polarization beam splitter. Accordingly, the polarization beam splitter can reflect the blue light B output from the blue array light source 20.

According to the above described configuration, the first area 25A of the light combining element 25 reflects the blue light B output from the blue array light source 20. In the embodiment, the blue light B corresponds to the first light having the first wavelength in the first polarization direction.

As shown in FIG. 2, the blue light B output from the blue array light source 20 enters the first area 25A of the light combining element 25 with the luminous flux width compressed through the afocal system 22.

Specifically, in the light combining element 25, the first area 25A is provided at the center of the light combining element 25. Further, the second area 25B is provided around the first area 25A.

As shown in FIG. 5, the planar shape of the light combining element 25 is a rectangular shape and the planar shape of the first area 25A is an oval shape. The optical axis ax1 and the illumination light axis ax2 pass through the center of the light combining element 25. That is, the first area 25A is provided on the optical axis ax1 and the illumination light axis ax2. An intersection point P of the optical axis ax1 and the illumination light axis ax2 is located at the center of the first area 25A.

As shown in FIG. 2, the light combining element 25 is placed at an angle of 45° relative to the optical axis ax1 and the illumination light axis ax2. In the plan view of the light combining element 25 in the direction along the optical axis ax1 or the illumination light axis ax2, the planar shape of the first area 25A is a circular shape as shown in FIG. 6. In the embodiment, the first area 25A is provided at the center of the light combining element 25, and thereby, alignment of the first area 25A with the optical axis ax1 or the illumination light axis ax2 is easier.

In the embodiment, the principal ray of the blue light B passes through the center of the first area 25A. The blue light B through the afocal system 22 is shaped as a pencil of light having a section in a substantially circular shape, and enters the first area 25A having the circular planar shape in good condition.

The first wave plate 28a is placed to face the first area 25A at one side (diffuser element 27 side) of the light combining element 25. In the embodiment, the placement of the first wave plate 28a and the first area 25A facing each other includes a placement of the first wave plate 28a at an angle of 45° relative to the surface of the first area 25A on the illumination light axis ax2. In the plan view from the direction along the illumination light axis ax2, the first wave plate 28a is provided to substantially overlap with the first area 25A.

In the embodiment, the first wave plate 28a is provided between the light combining element 25 and the diffuser element 27 and placed to face the first area 25A of the light combining element 25, and thus, the blue light B reflected by the first area 25A efficiently enters the first wave plate 28a.

The first wave plate 28a includes a quarter wave plate placed in the optical path between the light combining element 25 and the diffuser element 27. The quarter wave plate is a wave plate formed using crystal quartz.

In the light source device 2 of the embodiment, the blue light B output from the blue array light source 20 is compressed by the afocal system 22, and then, reflected by the first area 25A and entered into the first wave plate 28a. The blue light B is compressed, and thereby, may be entered into the first area 25A. Further, the blue light B is compressed, and thereby, the area of the first area 25A may be reduced. Therefore, the size of the first wave plate 28a into which the light reflected by the first area 25A is entered may be reduced.

The first wave plate 28a converts the blue light B into e.g. a blue light Bc as a right-handed circularly-polarized light. In the embodiment, the blue light Bc corresponds to a circularly-polarized second light having the first wavelength.

The blue light Bc enters the collecting system 26. The collecting system 26 includes e.g. lenses 26a, 26b. The blue light Bc through the homogenizer system 23 and the collecting system 26 enters the illuminated region of the diffuser element 27 in the homogenized illuminance distribution.

The diffuser element 27 diffusely reflects a part of the blue light Bc output from the collecting system 26 and outputs the fluorescent light YL. The diffuser element 27 has a fluorescent material 34, a substrate 35 supporting the fluorescent material 34, and a fixing member 36 fixing the fluorescent material 34 to the substrate 35.

In the embodiment, the fluorescent material 34 is fixed to the substrate 35 by the fixing member 36 provided between a side surface of the fluorescent material 34 and the substrate 35. The fluorescent material 34 contacts the substrate 35 on a surface opposite to the side that the blue light Bc enters.

A heat sink 38 is placed on a surface opposite to the supporting surface for the fluorescent material 34 in the substrate 35. In the diffuser element 27, heat maybe released via the heat sink 38 and thermal degradation of the fluorescent material 34 may be prevented.

The fluorescent material 34 is excited by absorbing the blue light Bc, and thereby, outputs the fluorescent light (yellow fluorescence) YL in e.g. a wavelength range from 500 to 700 nm. For example, as the fluorescent material 34, a fluorescent material layer formed by dispersion of fluorescent material particles in an inorganic binder of alumina or the like or a fluorescent material layer formed by sintering of fluorescent material particles without using an inorganic binder may be preferably used.

The fluorescent material 34 has a smaller refractive index difference inside, and backscatter of the blue light Bc is not expected. The diffuser element 27 of the embodiment has a diffuse reflection portion 34a that diffusely reflects the blue light Bc at the light incident side.

Figure 7:
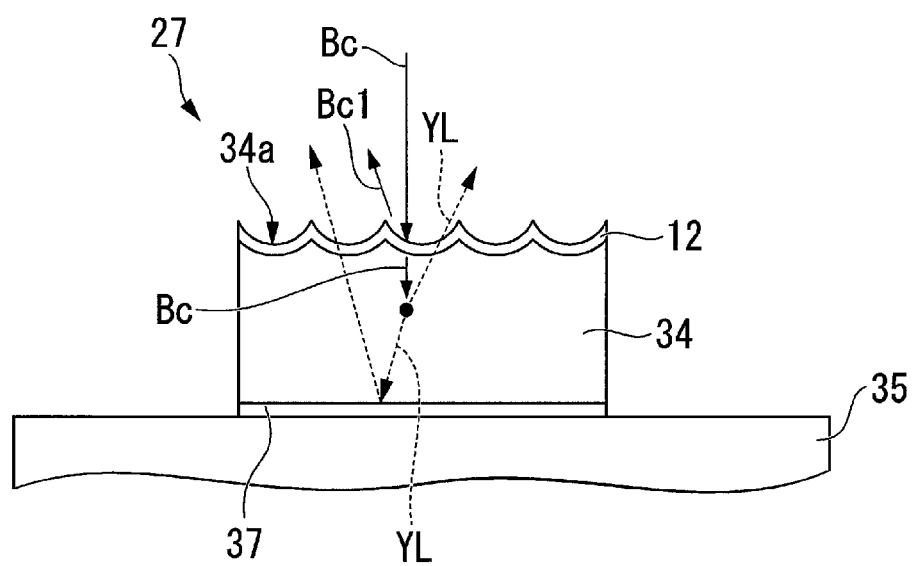
FIG. 7 is a sectional view showing a configuration of a diffuse reflection portion.

FIG. 7 is the sectional view showing the configuration of the diffuse reflection portion.

As shown in FIG. 7, the diffuse reflection portion 34a has a function of diffusely reflecting a part of the blue light Bc.

The diffuse reflection portion 34a includes a convex structure, concave structure, or concavo-convex structure formed by e.g. texture processing or dimple processing on the incident surface of the blue light Bc in the fluorescent material 34. In the embodiment, the case where the diffuse reflection portion 34a is directly formed on the surface of the fluorescent material 34 is taken as an example, however, the diffuse reflection portion may be formed on a light-transmissive member separately bonded to the surface of the fluorescent material 34.

The diffuse reflection portion 34a has an optical film 12 on the surface at the light incident side. The optical film 12 reflects a part of the blue light Bc entering from the collecting system 26 and transmits the rest of the blue light Bc. Further, the optical film 12 transmits the fluorescent light YL. The optical film 12 is formed using e.g. a dielectric multilayer film. The optical film 12 is formed to trace the concavities and convexities forming the diffuse reflection portion 34a. The optical film 12 is provided on the diffuse reflection portion 34a, and thereby, reflectance of the blue light Bc can be controlled. The diffuse reflection portion 34a of the embodiment has the optical film 12 that provides the reflectance of the blue light Bc by the diffuser element 27 is from 10% to 30%, for example.

Hereinafter, the light diffusely reflected by the diffuser element 27 is referred to as "blue diffused light Bc1".

The part of the blue light Bc entering the diffuser element 27 is diffusely reflected by the surface of the diffuse reflection portion 34a. For example, the diffuse reflection portion 34a reflects the blue light Bc as the right-handed circularly-polarized light as the blue diffused light Bc1 as a left-handed circularly-polarized light.

On the other hand, the rest of the blue light Bc entering the diffuser element 27 is transmitted through the diffuse reflection portion 34a and enters the fluorescent material 34. The fluorescent material 34 is excited by the blue light Bc and generates the fluorescent light YL. The fluorescent light YL is transmitted through the diffuse reflection portion 34a and output to the outside. Note that, of the fluorescent light YL generated in the fluorescent material 34, the component traveling toward the substrate 35 is reflected by a reflection layer 37 provided between the fluorescent material 34 and the substrate 35 and output to the outside.

The blue diffused light Bc1 diffusely reflected by the diffuse reflection portion 34a enters the collecting system 26. The collecting system 26 has a function as a pickup lens of parallelizing the diffusely reflected blue diffused light Bc1.

The blue diffused light Bc1 is converted into a parallel light by the collecting system 26, and then, enters the first wave plate 28a again. Therefore, the first wave plate 28a efficiently functions as a wave plate for the blue diffused light Bc1 entering as the parallel light, and may provide a predetermined phase difference to the blue diffused light Bc1.

The blue diffused light Bc1 is the light obtained by diffuse reflection of the blue light Bc, and the luminous flux width of the blue diffused light Bc1 is larger than the the luminous flux width of the blue light Bc. Accordingly, only the light of the blue diffused light Bc1 passing through the optical path of the blue light Bc enters the first wave plate 28a and the light passing through an optical path outer than the optical path of the blue light Bc does not enter the first wave plate 28a.

The left-handed circularly-polarized blue diffused light Bc1 entering the first wave plate 28a is converted into a P-polarized blue light Bp (in a second polarization direction) by the first wave plate 28a. In the embodiment, the blue light Bp corresponds to a third light having the first wavelength in the second polarization direction.

The blue light Bp output from the first wave plate 28a enters the first area 25A of the light combining element 25 again. The blue light Bp is converted into the P-polarized light, and thereby, transmitted through the first area 25A of the light combining element 25. The blue light Bp transmitted through the first area 25A of the light combining element 25 enters the second wave plate 28b.

The second wave plate 28b is placed to face the first area 25A of the light combining element 25. In the embodiment, the placement of the second wave plate 28b and the first area 25A facing each other refers to a placement of the second wave plate 28b at an angle of 45° relative to the surface of the first area 25A on the illumination light axis ax2. In the plan view in the direction along the illumination light axis ax2, the second wave plate 28b is provided to substantially overlap with the first area 25A and the first wave plate 28a. That is, the second wave plate 28b is provided between the light combining element 25 and the optical integration system 31 and placed to face the first area 25A of the light combining element 25.

In the embodiment, the second wave plate 28b is placed to face the first area 25A of the light combining element 25, and thus, the blue light Bp transmitted through the first area 25A efficiently enters the second wave plate 28b. The second wave plate 28b is placed in the optical path of the light through the first wave plate 28a, and the size of the second wave plate 28b is the same as the size of the first wave plate 28a.

The blue light Bp transmitted through the first area 25A is converted into the parallel light by the collecting system 26, and thus, the blue light Bp also enters the second wave plate 28b as the parallel light. Therefore, the second wave plate 28b efficiently functions as a wave plate for the blue light Bp entering as the parallel light, and may provide a predetermined phase difference to the blue light Bp.

The second wave plate 28b includes a quarter wave plate placed in a part of the optical path between the light combining element 25 and the optical integration system 31. The quarter wave plate is a wave plate formed using crystal quartz.

The second wave plate 28b converts the blue light Bp into e.g. a blue light Bc2 as a left-handed circularly-polarized light. In the embodiment, the blue light Bc2 corresponds to a circularly-polarized fifth light having the first wavelength. The blue light Bc2 enters the optical integration system 31.

On the other hand, the blue light Bc output from the diffuser element 27, but not passing through the first wave plate 28a enters the second area 25B of the light combining element 25. The blue light Bc is transmitted through the second area 25B (transparent substrate) and enters the optical integration system 31.

According to the light source device 2 of the embodiment, the polarization state of the part of the blue diffused light Bc1 diffusely reflected by the diffuser element 27 may be controlled to be transmitted through the first area 25A of the light combining element 25. The light source device 2 has the first wave plate 28a in the part of the optical path of the blue diffused light Bc1, and the first wave plate 28a may be downsized.

Further, in the light source device 2 of the embodiment, the blue light B compressed by the afocal system 22 is entered into the light combining element 25, and the area of the first area 25A may be reduced. Therefore, the first wave plate 28a into which the blue light B reflected by the first area 25A is entered may be further downsized. As described above, the second wave plate 28b has the same size as the downsized first wave plate 28a, and the second wave plate 28b itself is downsized.

Generally, a wave plate formed using crystal quartz is very expensive, and the cost of the light source device 2 may be reduced by downsizing of the first wave plate 28a and the second wave plate 28b. The cost reduction of the light source device 2 of the embodiment is realized by downsizing of the first wave plate 28a and the second wave plate 28b.

In the embodiment, the principal ray of the blue light Bc entering the diffuser element 27 coincides with the center axis (optical axis) of the collecting system 26.

Here, as a comparative example, a case where the principal ray of the blue light Bc entering the diffuser element 27 does not coincide with the center axis (optical axis) of the collecting system 26 is considered. In this case, the principal ray of the blue light Bc enters a peripheral portion of the collecting system 26, and the blue diffused light Bc1 is not isotropically diffused. Therefore, the principal ray of the blue diffused light Bc1 diffusely reflected by the diffuser element 27 does not pass through the center axis (optical axis) of the collecting system 26, and thus, the luminous flux shape of the blue diffused light Bc1 is distorted. The blue diffused light Bc1 having the distorted luminous flux shape does not enter the whole optical integration system 31, and the optical integration system 31 fails to efficiently function.

On the other hand, in the light source device 2 of the embodiment, the principal ray of the blue light Bc enters the center axis (optical axis) of the collecting system 26, and thereby, the blue diffused light Bc1 is isotopically diffused in all directions. Accordingly, the principal ray of the blue diffused light Bc1 diffusely reflected by the diffuser element 27 passes through the center axis (optical axis) of the collecting system 26, and thus, the blue diffused light Bc1 is a luminous flux having a section in a substantially circular shape. Therefore, according to the light source device 2 of the embodiment, the blue diffused light Bc1 efficiently enters the whole optical integration system 31, and the optical integration system 31 may effectively function.

In the light source device 2 of the embodiment, a laser beam (blue light B) having higher energy output from the blue array light source 20 enters the collecting system 26. Accordingly, a photo-elastic effect (birefringence) easily occurs due to the temperature rise in the collecting system 26. When birefringence occurs in the collecting system 26, the polarization state of the light transmitted through the collecting system 26 is disturbed.

In the light source device 2 of the embodiment, the blue light Bp converted into the P-polarized light after passing through the first wave plate 28a at twice is transmitted through the first area 25A of the light combining element 25.

Here, it is assumed that one-third of light of the entire luminous flux width in the blue light Bc1 diffusely reflected by the diffuser element 27 enters the first wave plate 28a. In this case, a ratio between the luminous flux area entering the first wave plate 28a and the luminous flux area not entering the first wave plate 28a of the blue light Bc1 is 1:8. That is, most (8/9) of the blue light Bc1 diffusely reflected by the diffuser element 27 is not used for polarization separation in the light combining element 25.

According to the configuration of the light source device 2 of the embodiment, if the polarization state in the above described collecting system 26 is disturbed, the influence on the polarization separation in the light combining element 25 may be reduced. Accordingly, in the light source device 2 of the embodiment, it is not necessary to form the collecting system 26 using quartz lenses with the smaller coefficient of thermal expansion for reduction of the influence by the photo-elastic effect (birefringence) in the collecting system 26. Therefore, the cost rise by the collecting system 26 using the expensive quartz lenses may be suppressed.

Further, the fluorescent light YL output from the fluorescent material 34 passes through the collecting system 26 and the first wave plate 28a.

The fluorescent light YL output from the fluorescent material 34 is a non-polarized light in various polarization directions. The fluorescent light YL is parallelized by the collecting system 26 and enters the light combining element 25. The fluorescent light YL is the luminous flux in various polarization directions, and thus, enters the light combining element 25 as the non-polarized light in various polarization directions even after passing through the first wave plate 28a. The fluorescent light YL entering the light combining element 25 is transmitted through the first area 25A and the second area 25B and output toward the optical integration system 31.

In the above described manner, the blue light Bc2, the blue light Bc1, and the fluorescent light YL enter the optical integration system 31. The blue light Bc2, the blue light Bc1, and the fluorescent light YL are combined, and thereby, the white illumination light WL is generated. The white illumination light WL is separated into the red light LR, the green light LG, and the blue light LB in the color separation and light guiding system 200. The blue light Bc and the blue diffused light Bc1 are separated as the blue light LB and the fluorescent light YL is separated as the red light LR and the green light LG.

The explanation will be made with reference to FIG. 2.

The optical integration system 31 has a first multi-lens 31a and a second multi-lens 31b. The first multi-lens 31a has a plurality of first small lenses 31am for splitting the illumination light WL into a plurality of partial luminous fluxes.

The lens surface of the first multi-lens 31a (the surfaces of the first small lenses 31am) and the respective image formation areas of the light modulation device 400R, the light modulation device 400G, and the light modulation device 400B are conjugated with each other. Accordingly, the shapes of the respective first small lenses 31am are substantially similar shapes (rectangular shapes) to the shapes of the image formation areas of the light modulation device 400R, the light modulation device 400G, and the light modulation device 400B. Thereby, the respective partial luminous fluxes output from the first multi-lens 31a respectively efficiently enter the image formation areas of the light modulation devices 400R, 400G, 400B.

The second multi-lens 31b has a plurality of second small lenses 31bm corresponding to the plurality of first small lenses 31am of the first multi-lens 31a. The second multi-lens 31b forms images of the respective first small lenses 31am of the first multi-lens 31a near the respective image formation areas of the respective light modulation devices 400R, 400G, 400B with the superimposing lens 33.

The illumination light WL transmitted through the optical integration system 31 enters the polarization conversion element 32.

The polarization conversion element 32 is formed by arrangement of polarization separation layers and wave plates (half wave plates) in an array form. The polarization conversion element 32 is an optical element that aligns the polarization direction of the illumination light WL in a predetermined direction. More specifically, the polarization conversion element 32 is an optical element to set the illumination light WL in correspondence with directions of the transmission axes of the polarizers (not shown) placed at the light incident sides of the light modulation device 400R, the light modulation device 400G, and the light modulation device 400B.

Thereby, the polarization directions of the red light LR, the green light LG, and the blue light LB obtained by separation of the illumination light WL transmitted through the polarization conversion element 32 correspond to the directions of the transmission axes of the light incident-side polarizers of the respective light modulation devices 400R, 400G, 400B. Therefore, the red light LR, the green light LG, and the blue light LB enter the image formation areas of the light modulation devices 400R, 400G, 400B in good condition, respectively, without being respectively shielded by the light incident-side polarizers.

The illumination light WL transmitted through the polarization conversion element 32 enters the superimposing lens 33. The superimposing lens 33 homogenizes the illuminance distribution in the illuminated region in cooperation with the optical integration system 31.

Here, when the light entering the polarization conversion element 32 is formed only by one polarization component (S-polarized light or P-polarized light), homogeneity of the light intensity distribution after transmission through the polarization conversion element 32 is lower compared to a case where the light is formed by both of the polarization components (S-polarized light and P-polarized light).

In related art, when a light entering a polarization conversion element is formed only by one polarization component, a quarter wave plate is provided at the upstream of the polarization conversion element 32 to convert the light entering the polarization conversion element 32 into a circularly-polarized light. However, in this case, the cost is higher by the quarter wave plate separately provided at the upstream of the polarization conversion element 32.

In the light source device 2 of the embodiment, the illumination light WL containing the blue light Bc and the blue diffused light Bc1 as the circularly-polarized lights and the fluorescent light YL as the non-polarized light enters the polarization conversion element 32. The blue light Bc and the blue diffused light Bc1 as the circularly-polarized lights contain the S-polarized light component and the P-polarized light component substantially at the same rate. Further, the fluorescent light YL as the non-polarized light contains the S-polarized light component and the P-polarized light component substantially at the same rate like the circularly-polarized lights.

The light source device 2 of the embodiment enters the illumination light WL containing both the S-polarized light component and the P-polarized light component substantially at the same rate into the polarization conversion element 32, and thereby, may improve the homogeneity of the light intensity distribution of the illumination light WL transmitted through the polarization conversion element 32. The red light LR, the green light LG, and the blue light LB formed by color separation of the illumination light WL having the higher homogeneity of the light intensity distribution homogeneously illuminate the image formation areas of the respective light modulation devices 400R, 400G, 400B, and thereby, an excellent image may be displayed.

As described above, according to the light source device 2 of the embodiment, the first wave plate 28a is provided in the part of the optical path of the blue diffused light Bc1 diffusely reflected by the diffuser element 27, and thus, the first wave plate 28a may be downsized. Therefore, the cost of the light source device 2 may be reduced by downsizing of the first wave plate 28a formed using the quartz crystal wave plate.

Further, according to the light source device 2 of the embodiment, the second wave plate 28b is provided in the optical path of the blue light Bp output from the first wave plate 28a and transmitted through the first area 25A of the light combining element 25, and thus, the cost may be reduced by downsizing of the second wave plate 28b formed using crystal quartz wave plate.

According to the projector 1 of the embodiment, the light source device 2 with the reduced cost by downsizing of the first wave plate 28a and the second wave plate 28b is provided, and thereby, the cost reduction of the projector 1 may be also realized. Further, according to the projector 1 of the embodiment, an image with a desired hue may be displayed by adjustment of the white balance of the illumination light WL using the light source device 2.

The present disclosure is not limited to the above described embodiment, but can appropriately be changed without departing from the scope of the present disclosure.

For example, in the above described embodiment, the structure of radiating the excitation light to the fluorescent material 34 fixedly placed is taken as an example of the diffuser element 27, however, a rotary-wheel structure in which a ring-shaped fluorescent material is placed on a rotatable circular disc may be employed.

Further, in the above described embodiment, the case where the afocal system 22 is used as a luminous flux width compression unit that compresses the luminous flux width of the blue light B output from the blue array light source 20 is taken as an example, however, the luminous flux width compression unit is not limited to that. For example, the blue beams B1 output from the plurality of light emitting elements 21 forming the blue array light source 20 may be folded by a mirror, and thereby, the gaps between the respective blue beams B1 may be narrowed for compression of the luminous flux width of the blue light B.

Furthermore, in the above described embodiment, the configuration in which the blue light B output from the blue array light source 20 is reduced by the afocal system 22 and entered into the first area 25A of the light combining element 25 is taken as an example, however, the present disclosure is not limited to that. For example, a configuration in which a single blue beam output from a single light emitting element is entered into the first area 25A of the light combining element 25 may be employed. In this case, the afocal system 22 that compresses the luminous flux width of the blue beam may be omitted.

In the above described embodiment, the example in which the light source device according to the present disclosure is mounted on the projector is shown, however, the device is not limited to that. The light source device according to the present disclosure may be applied to a lighting device, a headlight of an automobile, or the like.

What is claimed is:

1. A light source device comprising:
    a light emitting device that outputs a first light having a first wavelength in a first polarization direction;
    a first optical element having a first area that reflects the first light and a second area different from the first area;
    a second optical element into which the first light reflected by the first area of the first optical element is entered, converting the first light into a circularly-polarized second light having the first wavelength; and
    a diffuser element into which the second light output from the second optical element is entered, wherein
    the second light reflected by the diffuser element and entered into the second optical element is converted into a third light having the first wavelength in a second polarization direction by the second optical element,
    the third light output from the second optical element and entering the first area of the first optical element is transmitted in the first area of the first optical element,
    the second light reflected by the diffuser element and entered into the second area of the first optical element is transmitted in the second area of the first optical element, and
    a fourth light output from the diffuser element and entered into the first area and the second area of the first optical element and having a second wavelength is transmitted in the first area and the second area of the first optical element.

2. The light source device according to claim 1, wherein in the first optical element, the first area is provided at a center of the first optical element and the second area is provided around the first area.

3. A projector comprising:
    the light source device according to claim 2;
    a light modulation device that modulates the light output from the light source device according to image information and forms an image light; and
    a projection optical device that projects the image light.

4. The light source device according to claim 1, wherein the second optical element is placed to face the first area at one side of the first optical element.

5. A projector comprising:
    the light source device according to claim 4;
    a light modulation device that modulates the light output from the light source device according to image information and forms an image light; and
    a projection optical device that projects the image light.

6. The light source device according to claim 1, wherein the second optical element is formed using quartz crystal.

7. A projector comprising:
    the light source device according to claim 6;
    a light modulation device that modulates the light output from the light source device according to image information and forms an image light; and
    a projection optical device that projects the image light.

8. The light source device according to claim 1, further comprising a third optical element into which the third light output from the first area of the first optical element is entered, wherein
    the third optical element converts the third light into a circularly-polarized fifth light having the first wavelength.

9. The light source device according to claim 8, wherein the third optical element is placed to face the first area at another side of the first optical element.

10. A projector comprising:
    the light source device according to claim 9;
    a light modulation device that modulates the light output from the light source device according to image information and forms an image light; and
    a projection optical device that projects the image light.

11. The light source device according to claim 8, wherein the third optical element is formed using quartz crystal.

12. A projector comprising:
    the light source device according to claim 11;
    a light modulation device that modulates the light output from the light source device according to image information and forms an image light; and
    a projection optical device that projects the image light.

13. A projector comprising:
    the light source device according to claim 8;
    a light modulation device that modulates the light output from the light source device according to image information and forms an image light; and
    a projection optical device that projects the image light.

14. The light source device according to claim 1, wherein a diffuse reflection portion that diffusely reflects a part of the second light is provided at a light incident side of the diffuser element.

15. The light source device according to claim 14, wherein
    the diffuse reflection portion has an optical film that reflects the part of the second light and transmits the rest of the second light.

16. A projector comprising:
    the light source device according to claim 15;
    a light modulation device that modulates the light output from the light source device according to image information and forms an image light; and
    a projection optical device that projects the image light.

17. A projector comprising:
    the light source device according to claim 14;
    a light modulation device that modulates the light output from the light source device according to image information and forms an image light; and
    a projection optical device that projects the image light.

18. The light source device according to claim 1, further comprising a luminous flux width compression unit provided between the light emitting device and the first optical element and compressing a luminous flux width of the first light output from the light emitting device.

19. A projector comprising:
the light source device according to claim 18;
a light modulation device that modulates the light output from the light source device according to image information and forms an image light; and
a projection optical device that projects the image light.

20. A projector comprising:
the light source device according to claim 1;
a light modulation device that modulates the light output from the light source device according to image information and forms an image light; and
a projection optical device that projects the image light.

\* \* \* \* \*